United States Patent
Schips

(10) Patent No.: US 8,341,954 B2
(45) Date of Patent: Jan. 1, 2013

(54) HYDRODYNAMIC COUPLING

(75) Inventor: Rainer Schips, Ellwangen (DE)

(73) Assignee: Voith Patent GmbH, Heidenheim (DE)

( * ) Notice: Subject to any disclaimer, the term of this patent is extended or adjusted under 35 U.S.C. 154(b) by 96 days.

(21) Appl. No.: 12/488,955

(22) Filed: Jun. 22, 2009

(65) Prior Publication Data

US 2009/0308063 A1    Dec. 17, 2009

Related U.S. Application Data

(63) Continuation of application No. PCT/EP2007/010502, filed on Dec. 4, 2007.

(30) Foreign Application Priority Data

Dec. 22, 2006 (DE) .................. 10 2006 062 230

(51) Int. Cl.
*F16D 33/20* (2006.01)
(52) U.S. Cl. ........................... 60/338; 60/353
(58) Field of Classification Search ............ 60/338, 60/353, 365
See application file for complete search history.

(56) References Cited

U.S. PATENT DOCUMENTS

| | | | |
|---|---|---|---|
| 2,359,930 A | 4/1941 | Miller | |
| 2,466,721 A | 4/1949 | Maurer et al. | |
| 2,635,429 A | 4/1953 | Norwood | |
| 2,946,416 A | 7/1960 | Snoy | |
| 3,260,052 A * | 7/1966 | Stabler | 60/365 |
| 3,426,535 A | 2/1969 | Mlacker et al. | |
| 3,744,598 A | 7/1973 | Hanke et al. | |
| 3,955,367 A * | 5/1976 | Becker | 60/353 |
| 4,084,374 A | 4/1978 | Schlitz | |
| 4,699,022 A | 10/1987 | Stadt et al. | |
| 4,744,443 A | 5/1988 | Brosius | |
| 5,090,523 A | 2/1992 | Vogelsang | |
| 5,228,544 A | 7/1993 | Heinzelmann et al. | |
| 5,279,262 A | 1/1994 | Muehleck | |
| 5,333,707 A | 8/1994 | Kaneda | |
| 6,193,166 B1 | 2/2001 | Miller et al. | |
| 6,234,285 B1 | 5/2001 | Friedrich et al. | |
| 7,188,712 B2 | 3/2007 | Vogelsang et al. | |
| 2009/0308063 A1 | 12/2009 | Schips | |

FOREIGN PATENT DOCUMENTS

| | | |
|---|---|---|
| AU | 37284/71 | 6/1973 |
| DE | 2 033 817 | 1/1972 |
| DE | 43 06 743 A1 | 8/1994 |
| DE | 44 20 116 A1 | 12/1995 |
| DE | 196 46 597 B4 | 11/2005 |

(Continued)

OTHER PUBLICATIONS

Dubbel, Taschenbuch für Maschinenbau [Pocket Book of Engineering], 18th Edition, p. R 50, Jul. 1995.

*Primary Examiner* — Daniel Lopez
(74) *Attorney, Agent, or Firm* — Taylor IP, P.C.

(57) ABSTRACT

A hydrodynamic coupling has an impeller and a turbine wheel that together form a toroidal working chamber. Viewed as an axial section through the hydrodynamic coupling the working chamber has a circular or essentially circular cross-section with a convexity in the axial direction on the circumference in the radially outer area of said turbine wheel and/or in the radially inner area of said impeller.

14 Claims, 2 Drawing Sheets

FOREIGN PATENT DOCUMENTS

| | | |
|---|---|---|
| DE | 10 2006 062 230 A1 | 6/2008 |
| DE | 10 2008 002 203 A1 | 12/2009 |
| DE | 10 2009 017 996 A1 | 10/2010 |
| EP | 2 126 393 B1 | 10/2010 |
| FR | 1446027 | 7/1966 |
| FR | 1494032 | 9/1967 |
| GB | 359501 | 10/1931 |
| GB | 949 907 | 2/1964 |
| GB | 1 234 522 | 6/1971 |
| WO | 95-33631 A1 | 12/1995 |
| WO | 97-13651 A1 | 4/1997 |

* cited by examiner

HYDRODYNAMIC COUPLING

CROSS REFERENCE TO RELATED APPLICATIONS

This is a continuation of PCT application No. PCT/EP2007/010502, entitled "HYDRODYNAMIC COUPLING", filed Dec. 4, 2007, which is incorporated herein by reference.

BACKGROUND OF THE INVENTION

1. Field of the Invention

The invention relates to a hydrodynamic coupling, that is a turbo-engine, that works according to the Föttinger principle in order to transmit drive power hydrodynamically and thus wear-free 2. Description of the Related Art Hydrodynamic couplings have been known for decades. They have an impeller and a turbine wheel that form a toroidal working chamber that is filled with or can be filled with working medium. One skilled in the art distinguishes between constant filling couplings and flow-through couplings. In constant filling couplings, the working medium is always disposed within the hydrodynamic coupling. In flow-through hydrodynamic couplings, an external working medium cycle is connected to the coupling so that the working medium flows into the hydrodynamic coupling via an inlet and is conducted out of the hydrodynamic coupling via an outlet.

Hydrodynamic couplings are used in motor vehicles, especially in the drive train, for instance for starting up the vehicle, and in stationary systems for wear-free transmission of drive power to a driven engine. The former couplings can be called vehicle couplings, and the latter can be called industrial couplings.

When hydrodynamic couplings are employed in the drive train of a motor vehicle, for instance as starting couplings, it is fundamentally desirable that the coupling is able to transmit a high power or a high torque from the driving side (the impeller) to the output side (the turbine wheel) using the hydrodynamic working medium cycle, as a rule an oil or water cycle. Thus a hydrodynamic coupling is advantageously designed such that it has the highest possible $\lambda$ progression or torque progression over the speed ratio v or the slip s. Torque progression is the progression of torque that is transmittable at a specific speed ratio or a specific slip using the hydrodynamic coupling. The performance figure $\lambda$ is a characteristic parameter of the hydrodynamic coupling that is known to one skilled in the art. The definition of $\lambda$ is provided for instance in Dubbel, Taschenbuch für Maschinenbau [Pocket Book of Engineering], 18th Edition, page R 50. It is calculated from the torque applied to the impeller or from the power applied to the impeller relative to the density p of the working medium, the cycle diameter D, and the angular velocity co of the pump:

$$\lambda = [(M_p)/(\rho D^5 \omega_p^2)] = [(P_p)/(\rho D^5 \omega_p^3)]$$

The speed ratio v is calculated from the speed of the turbine wheel divided by the speed of the impeller. The slip s in percent is calculated as follows:

$$s = (1-v) \times 100$$

However, a high torque progression or $\lambda$ progression for a hydrodynamic coupling can lead to the hydrodynamic coupling causing the engine to stall when there is high slip, for instance at 100 percent slip, during acceleration of the vehicle from zero or a slow engine speed because the torque transmitted by the hydrodynamic coupling and against which the engine is working is too great. In order to prevent this, in the past the $\lambda$ progression has been reduced adequately by a corresponding reduction in the size of the hydrodynamic coupling or a reduction in the capacity of the hydrodynamic coupling so that there is no question of the engine stalling, even at 100 percent slip.

In FIG. 1, a solid line depicts a $\lambda$ progression or torque progression (M) over slip s or speed ratio v that prevents the drive engine from stalling. A dashed line is used to represent a $\lambda$ progression or torque progression that improves the coupling properties in a low slip range or great speed ratio compared to the progression represented by the solid line. However, this progression depicted with the dashed line could lead to the drive engine stalling in a high slip range.

A performance characteristic or $\lambda$ progression for the hydrodynamic coupling that combines the advantages of both aforesaid design characteristics would be desirable. This is true both for hydrodynamic couplings in motor vehicles and in stationary systems (industrial couplings).

What is needed in the art is a hydrodynamic coupling that avoids the aforesaid problems and satisfies the requirements described.

SUMMARY OF THE INVENTION

The present invention provides a hydrodynamic coupling having an impeller and a turbine wheel that together form a toroidal working chamber, characterized in that viewed as an axial section through the hydrodynamic coupling said working chamber has a circular or essentially circular cross-section with a convexity in the axial direction on the circumference in the radially outer area of said turbine wheel and/or in the radially inner area of said impeller.

The present invention provides a performance characteristic or $\lambda$ progression for the hydrodynamic coupling that combines the advantages of both aforesaid design characteristics (see for instance the dot-dash progression shown in FIG. 1).

The present invention can be used in both types of hydrodynamic couplings, that is, constant filling couplings and flow-through hydrodynamic couplings.

The present invention can be used both in vehicle couplings and in industrial couplings.

Normally the working chamber of a hydrodynamic coupling is circular or essentially circular when viewed as an axial section through the hydrodynamic coupling. Given a complete axial section through the hydrodynamic coupling, the term circular relates to each of the two section surfaces through the working chamber that result when there is a toroidal working chamber. With respect to the desired cycle flow of the working medium, the shape or circumferential contour of the working chamber is selected radially from the inside to the outside in the impeller, then axially into the turbine wheel, then radially from the outside to the inside in the turbine wheel, and finally axially from the turbine wheel into the impeller. The torque or the rotation from the impeller to the turbine wheel is transmitted by way of this cycle flow in the working chamber.

In the inventive hydrodynamic coupling, as well, the working chamber is circular or essentially circular viewed as an axial section through the hydrodynamic coupling. However, instead of a completely circular shape, it has a convexity in the axial direction on the circumference of the working chamber in the radially outer area of the turbine wheel relative to the axis of rotation of the coupling. Alternatively or additionally the convexity can also be embodied in the radially inner area of the impeller.

This inventively provided convexity has the following effect: When the working medium flows out of the impeller into the turbine wheel, as described its flow direction is essentially parallel to the coupling rotational axis, at least viewed in axial section through the hydrodynamic coupling. The working medium, which leaves the impeller in the radially outer area of the impeller, thus flows toward and into the convexity. Due to the circumferential component that also now comes into play in the working medium flow from the impeller into the turbine wheel, however, a work medium flow essentially directed into the convexity does not occur in every operating condition relative to the circumferential direction of the hydrodynamic coupling and thus circularly about the rotational axis of the hydrodynamic coupling. On the contrary, there are certain operating conditions, specifically at a high slip between impeller and turbine wheel, in which the circumferential components of the working medium flow features the flow being more strongly directed in the circumferential direction of the hydrodynamic coupling than in the axial direction of the hydrodynamic coupling. In these operating conditions, the working medium flows directly into the convexity only to a limited extent or the working medium essentially does not flow or does not flow directly into the convexity. In contrast, at low slip the working medium flow is directed less in the circumferential direction and is thus more strongly directed in the axial direction, and direct flow into the convexity is more pronounced in comparison.

Whenever the flow direction from the impeller into the turbine wheel is not strongly directed into the convexity, there is comparatively strong turbulence in the working medium, which reduces the maximum torque that can be transferred from the impeller to the turbine wheel, that is, reduces the performance of the hydrodynamic coupling. Thus exactly that which was described as desirable in the introductory description is attained. In operating conditions with high slip, the torque transmission is relatively limited in comparison to a hydrodynamic coupling without the inventive convexity in the working chamber, and in operating conditions with low slip the power transmission or torque transmission is completely or nearly unchanged or is not reduced compared to a conventional working chamber section that is completely or essentially circular.

The inventive convexity can be described in general as follows: When the circumference of the working chamber for the hydrodynamic coupling is symmetrical in an axial section through the hydrodynamic coupling mirrored via an axial perpendicular that runs through the separation gap between impeller and turbine wheel perpendicular to the rotational axis of the hydrodynamic coupling, the convexity is a variance in the circumference of this symmetrical "basic course" of the circumference. Alternatively or in addition, it is possible to use as a mirror-image axis to the description of this variance in symmetry an axis parallel to the rotational axis of the hydrodynamic coupling that runs on the center diameter through the working chamber, that is, as a rule through the rotational center of the working medium in the working chamber when the hydrodynamic coupling is operating. Thus it is clear that the term "essentially circular" or "circular" is to be understood broadly and should even include elliptical, oval, and other geometries that vary from a precise circular shape.

The specific shape of the convexity can vary. A convexity that is angular in an axial section through the hydrodynamic coupling is possible, and the angle can also be rounded off. There can be only a single angle, or there can be a plurality of angles. If there is a single angle, the convexity has for instance two sides of approximately or exactly equal length that are joined at the angle, which can be rounded off. The two sides can be arranged at a right angle to one another or can be arranged at a different angle, an acute angle, or an obtuse angle.

Alternatively, the convexity can also be arc-shaped or semi-circular, having a diameter that is different from the diameter of the working chamber cross-section. Other shapes are also possible.

Viewed in the circumferential direction, the convexity can be embodied continuous or interrupted. Interrupted shall be construed to mean that only individual chambers, or portions of these chambers, are provided between two blades that are arranged circumferentially adjacent to one another. For instance, every second, third, fourth, or $n^{th}$ chamber between two blades can be provided with the convexity.

Given a convexity embodied continuously circumferentially, the latter can have a constant cross-section or a cross-section that varies across the circumferential direction.

Special advantages in terms of the torque progression or the $\lambda$ progression result when the inventive convexity is provided in a hydrodynamic coupling with a baffle disk. Such a baffle disk is a mechanical body that can be selectively added to and removed from the working chamber, for instance by displacement, rotation, or the like, in order to influence the working medium cycle in the working chamber. When a baffle disk is added to the working chamber, the working medium cycle in the working chamber is disrupted and thus the power or the torque transmission is reduced compared to an undisrupted working medium cycle without the addition of a baffle disk.

Naturally the mechanical body can have a shape other than that of a disk so that it is possible to selectively disrupt the working medium cycle in general by way of a baffle element.

When such a baffle disk is provided in the working chamber, it can be arranged or added particularly advantageously, again viewed in an axial section through the hydrodynamic coupling, in a sector of the cross-section of the working chamber that is diametrically opposite the convexity. For instance, the convexity is provided in the radially outer area of the turbine wheel and the sector for the baffle disk is provided in the radially inner area of the impeller. In particular, if the cross-section of the working chamber in the axial section through the hydrodynamic coupling is divided into four quadrants, and these quadrants are numbered 1 through 4 starting radially inside in the impeller, then radially outside in the impeller, radially outside in the turbine wheel, and radially inside in the turbine wheel, the baffle disk can be provided in quadrant 1 and the convexity can be provided in quadrant 3. A different embodiment is also possible, for instance arranging the convexity in quadrant 1 and the baffle disk in quadrant 4.

It has been determined that the inventive effect can be intensified by embodying the hydrodynamic coupling with oblique blades. This means that the blades in the impeller and turbine wheel are not perpendicular relative to an axis-perpendicular plane through the hydrodynamic coupling but rather are arranged at an angle that is less than 90°. The angle of incidence (relative to this plane) of the impeller blades can differ from that of the turbine wheel blades; for instance, the blades of the impeller can be more oblique than the blades of the turbine wheel. This means that the blades of the impeller are at for instance an angle of 65° relative to the axis-perpendicular plane and the blades of the turbine wheel are at an angle of 70°.

In principle, the inventive effect, specifically reducing the torque transmitted when the slip is high, can be intensified with increasingly obliquely positioned blades for the impeller and the turbine wheel. However, it has been determined that the effect can be lost if the positioning is too oblique, for instance at an angle of inclination of less than 60°. The angle of inclination for the blades in the impeller and turbine wheel therefore is advantageously in the range of 60° to less than 90°, in particular from 60° to 80° or 65° to 75°. The impeller can in particular be more sharply inclined than the turbine wheel by 5° or 10°.

Another advantage of the inventive method is that a correspondingly embodied hydrodynamic coupling has relatively low no-load losses because even the air that is in the working chamber and is discharged by the working medium is carried into the inventively provided convexity that differs from the basic course of the working chamber and is swirled around, and thus the undesired torque transmission is reduced or suppressed.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
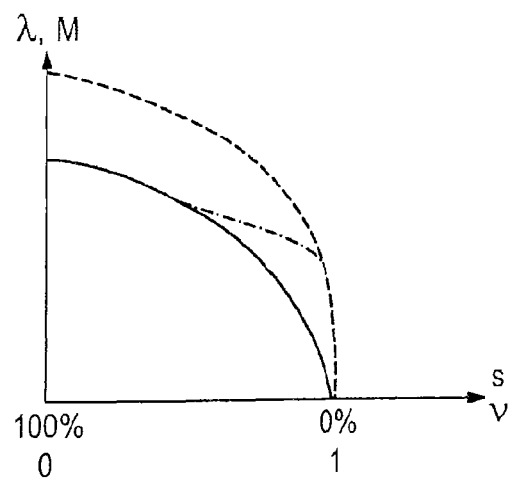
FIG. 1 depicts a λ progression or torque progression over the slip or the speed ratio of an inventively embodied hydrodynamic coupling.

Referring now to the drawings, and more particularly to FIG. 1, FIG. 1 was already explained above. With the inventive hydrodynamic coupling, it is possible to attain a λ progression or torque progression over slip or speed ratio, beginning at 100 percent slip, initially along the solid line, then along the dot-dash line, and finally along the dashed line. In the past only the progression along the solid line or along the dashed line was possible.

Figure 2:
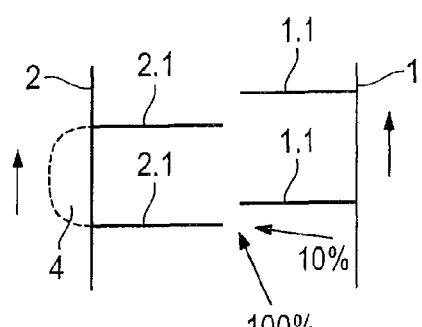
FIG. 2 is a schematic top-view of the working medium flow in the radial direction of the hydrodynamic coupling, from outside to inside.

FIG. 2 depicts the axial component and the circumferential component of the working medium flow from impeller 1 into turbine wheel 2 at 10% slip and at 100% slip. The dashed line indicates the convexity 4 in the turbine wheel. The impeller blades and turbine blades for impeller 1 and turbine wheel 2 are indicated with 1.1 and 2.1 respectively. The two perpendicular arrows on the left and right in FIG. 2 indicate the direction of rotation for impeller 1 and turbine wheel 2.

This figure depicts in particular the effect of the speed ratio between turbine wheel and impeller or of the slip on the flow direction of the working medium with respect to the convexity 4. When the slip is higher, the flow of the working medium into the convexity 4 is not as strong, which leads to more vigorous turbulence and thus to disruption of the working medium cycle. When the slip is lower there is a more direct flow to the convexity 4 in the working chamber, which causes less turbulence and therefore less disruption to the working medium cycle.

Figure 3:
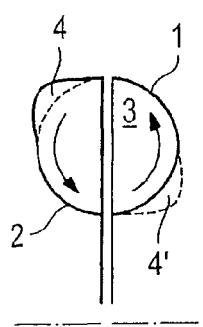
FIG. 3 depicts potential arrangements of the inventively provided convexity.

FIG. 3 depicts possible positions for the convexity 4 in the area of the circumference of the working chamber 3. For instance, a convexity 4 can be provided in the radially outer area of the turbine wheel 2. In addition or alternatively, a convexity 4' can be provided in the radially inner area of the impeller 1.

Figure 4:
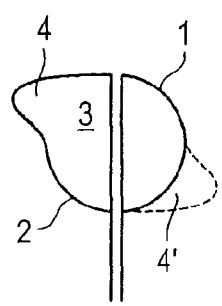
FIG. 4 depicts alternative embodiments for the convexity.

FIG. 4 again depicts alternative sectional surfaces for the convexity 4 or convexity 4'. Compared to FIG. 3, the convexities 4, 4' are not as close to a right angle and linearly limited but rather are more rounded, but with a smaller or more acute tip in the axial direction of the hydrodynamic coupling.

Figure 5:
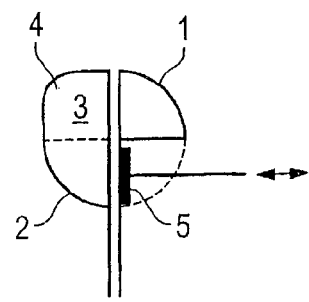
FIG. 5 depicts a hydrodynamic coupling having convexity and baffle disk.

FIG. 5 depicts one possible combination of a convexity 4 with a displaceable baffle disk 5 in the working chamber 3. The baffle disk 5 can be inserted in the axial direction into the radially inner area of the impeller 1 and can be removed from this area. The convexity 4 is provided in the radially outer area of the turbine wheel 2 in the working chamber 3.

Figure 6:
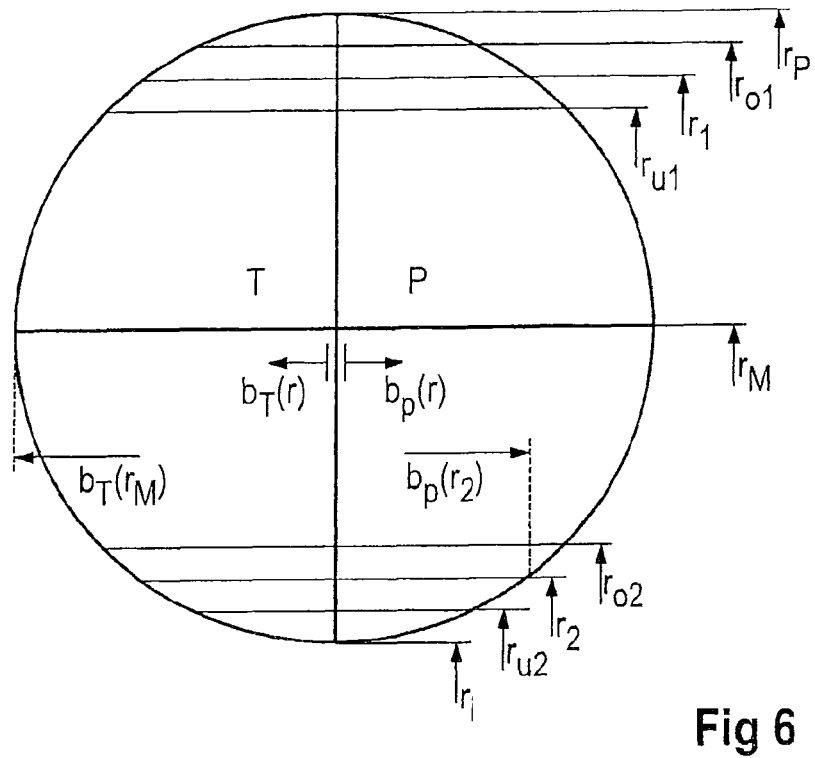
FIG. 6 is a schematic representation for explaining a mathematical description of an inventive embodiment for the convexity.

FIG. 6 depicts different radii for defining the circumference of the working chamber in an axial section through the hydrodynamic coupling. If this axial section is divided into four quadrants (see the lines of symmetry), the radius $r_1$ relates to the two radially outer quadrants, that is, one quadrant each from the turbine wheel (T) and the impeller (P). Radius $r_2$ relates to the two radially inner quadrants, one quadrant from the impeller and one quadrant from the turbine wheel.

$r_M$ describes the mean radius of the working chamber, that is, the line of symmetry that is parallel to the rotational axis of the hydrodynamic coupling and that divides the cross-section of the working chamber into two mirror-image halves of the same size.

$r_p$ describes the outer radius and $r_i$ describes the inner radius of the working chamber.

The radii $r_u$ and $r_o$, each with the indices 1 and 2, describe the limits for the radial areas, within which the circumference is defined, in accordance with the formulas that follow, in order to describe an inventively provided convexity. These radii are calculated as follows with respect to the outer and the inner radius of the working chamber:

$$r_{o1} = r_i + 0.97\,(r_p - r_i)$$

$$r_{u1} = r_i + 0.75\,(r_p - r_i)$$

$$r_{o2} = r_i + 0.15\,(r_p - r_i)$$

$$r_{u2} = r_i + 0.03\,(r_p - r_i)$$

Furthermore, the mean radius is defined as follows:

$$r_M = 0.5\,(r_p - r_i)$$

The height of the working chamber is defined as follows:

$$H = r_p - r_i$$

The contour of the inventive convexity can then be described in accordance with one or more of the following formulas:

(1) The contour of the convexity for any desired (that is, not necessarily for each) radius $r_1$ between $r_{u1}$ and $r_{o1}$ satisfies the following condition $1.05 \cdot b_T(r_2) < b_T(r_1) < 1.5 \cdot b_T(r_M)$, where $r_2 = r_i + r_p - r_1$ (2) The contour of the convexity for any desired (that is, not necessarily for each) radius $r_1$ between $r_{u1}$ and $r_{o1}$ satisfies the following condition $1.05 \cdot b_P(r_1) < b_T(r_1) < 1.5 \cdot b_P(r_M)$ (3) The contour of the convexity for any desired (that is, not necessarily for each) radius $r_2$ between $r_{u2}$ and $r_{o2}$ satisfies the following condition $1.05 \cdot b_T(r_2) < b_P(r_2) < 1.5 b_T(r_M)$ The factor 1.05 in the three formulas above can also be replaced with another factor that is greater than 1, and for instance can be in the range between 1.01 and 1.1.

The ratio of the axial width B of the working chamber to the outer diameter $D_p$ of the working chamber or relative to the height H of the working chamber can read as follows:

$$0.2 < \frac{B}{D_P} < 0.35$$

$$0.6 < \frac{B}{H} < 1.6$$

Figure 7:
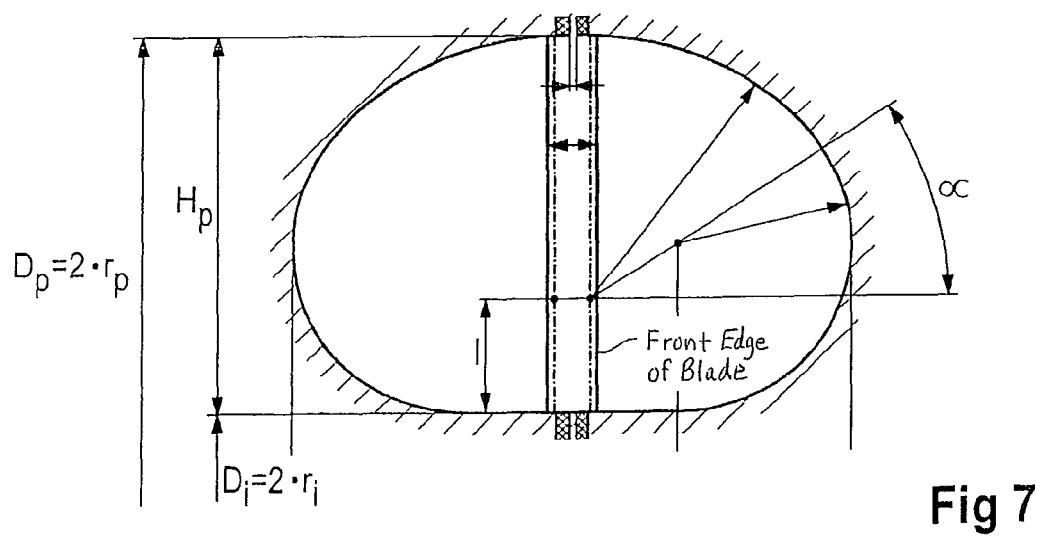
FIG. 7 depicts the axial section through the hydrodynamic coupling for one possible "basic shape" for the circumference of the working chamber, it being possible to additionally attach the inventive convexity thereto.

FIG. 7 again provides a purely schematic depiction of a basic shape of a working chamber, which shape is here termed essentially circular. A convexity can inventively be attached to such a basic shape.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A hydrodynamic coupling, comprising:
an impeller including a first radially inner terminating end; and
a turbine wheel including a second radially inner terminating end, said impeller and turbine wheel together forming a toroidal working chamber, viewed as an axial section through the hydrodynamic coupling said working chamber having one of a circular and an essentially circular cross-section with a convexity which extends said working chamber in an axial direction, said convexity being on a circumference in at least one of a radially outer area of said turbine wheel and a radially inner area of said impeller, no convexity being on a circumference of a radially inner area of said turbine wheel, said first radially inner terminating end and said second radially inner terminating end aligning with one another.

2. The hydrodynamic coupling in accordance with claim 1, wherein at least one said convexity has two substantially straight sides which are connected to each other in said axial section through the hydrodynamic coupling.

3. The hydrodynamic coupling in accordance with claim 2, wherein at least one said convexity has a connection between said two substantially straight sides, said connection between said two substantially straight sides being rounded.

4. The hydrodynamic coupling in accordance with claim 1, wherein at least one said convexity is arc-shaped in said axial section through the hydrodynamic coupling.

5. The hydrodynamic coupling in accordance with claim 1, wherein at least one said convexity is embodied continuously in a circumferential direction of the hydrodynamic coupling.

6. The hydrodynamic coupling in accordance with claim 1, wherein at least one said convexity is embodied continuously in a circumferential direction of the hydrodynamic coupling with a constant cross-section.

7. The hydrodynamic coupling in accordance with claim 1, wherein at least one said convexity is embodied discontinuously in a circumferential direction of the hydrodynamic coupling with one of a varying cross-sectional surface and a plurality of interruptions.

8. The hydrodynamic coupling in accordance with claim 1, further comprising a baffle element that is selectively inserted into said working chamber in order to disrupt a working medium cycle in said working chamber.

9. The hydrodynamic coupling in accordance with claim 8, wherein said baffle element is a baffle disk.

10. The hydrodynamic coupling in accordance with claim 9, wherein, viewed in said axial section through the hydrodynamic coupling, said baffle disk is selectively inserted in a sector of said cross-section of said working chamber that is diametrically opposite at least one said convexity.

11. The hydrodynamic coupling in accordance with claim 1, wherein said impeller and said turbine wheel each have a plurality of blades that are arranged obliquely relative to a plane that is perpendicular to an axis of rotation for the hydrodynamic coupling at an angle of less than 90°.

12. The hydrodynamic coupling in accordance with claim 1, wherein said impeller and said turbine wheel each have a plurality of blades that are arranged obliquely relative to a plane that is perpendicular to an axis of rotation for the hydrodynamic coupling at an angle of 60° to 80°.

13. The hydrodynamic coupling in accordance with claim 1, wherein said impeller and said turbine wheel each have a plurality of blades that are arranged obliquely relative to a plane that is perpendicular to an axis of rotation for the hydrodynamic coupling at an angle of 65° to 75°.

14. A hydrodynamic coupling, comprising:
an impeller; and
a turbine wheel, said impeller and turbine wheel together forming a toroidal work space, said work space, when viewed in an axial cross-section through the hydrodynamic coupling, having one of a circular and an essentially circular cross-section with a bulge which extends said work space in an axial orientation, said turbine wheel forming a single said bulge in said axial orientation, said single bulge formed by said turbine wheel being at a perimeter of a radial outer section of said turbine wheel.

* * * * *